United States Patent [19]

Patitsas

[11] Patent Number: 5,049,609
[45] Date of Patent: Sep. 17, 1991

[54] COATING COMPOSITION AND COATED TIRE

[75] Inventor: George P. Patitsas, Kent, Ohio

[73] Assignee: The Goodyear Tire & Rubber Company, Akron, Ohio

[21] Appl. No.: 492,159

[22] Filed: Mar. 13, 1990

Related U.S. Application Data

[62] Division of Ser. No. 322,752, Mar. 13, 1989, Pat. No. 4,911,218.

[51] Int. Cl.$^5$ ............................ C08K 3/34; C08K 3/40; C08K 5/05; C08K 29/04
[52] U.S. Cl. ................................... 524/386; 524/387; 524/494; 524/847; 524/449
[58] Field of Search ................ 524/449, 386, 387, 494, 524/847

[56] References Cited

U.S. PATENT DOCUMENTS

| | | | |
|---|---|---|---|
| 3,084,133 | 4/1963 | Sirota et al. | 524/449 |
| 4,599,267 | 7/1986 | Kwon et al. | 525/319 |
| 4,818,782 | 4/1989 | Bissot | 524/449 |

Primary Examiner—Joseph L. Schofer
Assistant Examiner—Tom Weber
Attorney, Agent, or Firm—Henry C. Young, Jr.

[57] ABSTRACT

A composition comprised of polyvinylalcohol coating and at least one water insoluble particulate organic or inorganic material having a plate-like structure. Preferred particulate materials are flake mica and flake glass. In addition, there is provided a coated rubber tire having at least one of its surfaces coated with such composition.

2 Claims, No Drawings

COATING COMPOSITION AND COATED TIRE

This is a division of application Ser. No. 07/322,752 filed on Mar. 13, 1989, now U.S. Pat. No. 4,911,218.

FIELD

This invention relates to a coating composition for various substrates and to a substrate coated with such composition. More particularly, it relates to a coating composition for a cured rubber substrate and to such a coated cured rubber substrate. More specifically, the invention relates to a protective coating composition for a rubber tire sidewall and, a tire having a sidewall with such coating thereon.

BACKGROUND

Tire sidewalls are often coated with protective paints or coatings, particularly tire sidewalls having a color which contrasts with the typical black colored remainder of the tire. The general purpose of such a protective coat or paint is to inhibit or prevent migration of chemicals to the tire rubber composition from the surface of an adjacent black colored tire which would otherwise tend to stain and thus, discolor the rubber. The staining usually becomes evident after exposure of the contacted rubber surface to ultraviolet light such as sunlight. Such contact staining phenomenon is well known.

Rubber tires are typically black in color due to the carbon black reinforcement contained therein. If a contrasting or other color is desired for a part of the tire, then the carbon black is deleted therefrom and a coloring pigment used. Conventionally, various of the compounding ingredients used in the formulation of rubber for the manufacture of rubber products such as tires are of the staining type, namely, amine based antidegradants and aromatic rubber processing oils. Such materials tend to migrate to the surface of the rubber and may stain or discolor a rubber surface of another rubber article which may come in contact with it for a period of time, particularly after the contacted rubber is exposed to ultraviolet light.

Often, a polyvinylalcohol (PVA) based coating is used to protect such contrastingly colored rubber surfaces from other rubber surfaces of the staining type because the polyvinylalcohol itself tends to be a barrier for the migration of such staining material. Moreover, the PVA can normally be easily removed from the coated rubber surface, when and if desired, by simple water washing, usually with a soap solution, since the PVA itself normally has a relatively high degree of water solubility, particularly when the water contains a surfactant. Thus, the PVA coat is typically used for storage and shipping conditions and is usually removed by water washing by the user. Such use is well known.

PVA is normally used in conjunction with (mixed with) a plasticizer therefor so that the resulting PVA-based coating has a degree of flexibility. Such PVA mixture is referred to herein as PVA coating.

Tires are often stored under varying circumstances for various purposes so that they may be in contact with each other for a period of time such as, for example, storage during their shipping or transportation to various locations and warehouse storing. The storage conditions can vary considerably and, sometimes, the tires are stored under relatively high humidity conditions and sometimes at elevated temperatures.

Under such circumstances, where the tire surface has a PVA-based coating thereon, it has been observed that under relatively high humidity conditions the PVA based coating softens and easily scuffs or abrades away, particularly as one tire may rub against another during shipment, thereby leaving a portion of the contrastingly colored sidewall unprotected and susceptible to chemical contact migrating staining from other adjacent and contacting rubber products, including tires.

At elevated temperatures, the aforesaid staining ingredients have a greater tendency to migrate to the surface of its host cured rubber product and, consequently, contribute to the staining of an adjacent and contacting rubber surface which is contrastingly light colored—even through many conventional (including polyvinyl alcohol) protective barrier coatings.

Accordingly, it is desired to provide a coating composition and a resultant coated rubber product, particularly a coated tire sidewall rubber surface, which will retard, inhibit and/or prevent the migration of amine based antidegradants and aromatic rubber processing oils onto the rubber sidewall surface, such as a white sidewall, from an adjacent and contacting black rubber surface.

DISCLOSURE AND PRACTICE OF THE INVENTION

In accordance with this invention, composition is comprised of polyvinylalcohol (PVA) coating, and at least one water insoluble particulate organic and/or inorganic material, preferably an inorganic material, having a plate-like structure in a weight ratio of such particulate material to the PVA in the coating (the PVA resin itself) in the range of about 1/6 to about 1/1.

In further accordance with this invention, a coating composition is comprised of polyvinylalcohol coating and about 16 to about 100 parts by weight of at least one plate-like structured material selected from mica and flake glass in a weight ratio of flake mica and/or flake glass based on the PVA of said coating.

Preferably, the mica and/or flake glass has a particle size in the range of about one to about 300 microns, more preferably about 1 to about 50 microns. A fine particle size is desired to enhance sprayability of the water-based coating composition.

The plate-like structured material is of such materials having two substantially parallel opposing plate-like surfaces with an average width to thickness ratio being in the range of about 5/1 to about 30/1. Typically, an average thickness is about 1 to about 2 microns.

In the practice of this invention, it is understood that the PVA coating includes a suitable plasticizer for the PVA, such as for example, glycerin and/or polyglycerol is typically used with the PVA in order to make the PVA more flexible. While the choice of plasticizers may not be entirely critical, it should be a plasticizer which does not substantially degrade the resistance of the PVA to the migration of the aforesaid staining materials. For such purposes, glycerin and/or polyglycerol are often used. However, if desired, the plasticizer can include a small amount of polyalkylenetherglycol, preferably a polyethylenetherglycol, with the amount used being commensurate with stain retardance desired. Such materials are relatively well known by those having skill in such art for such purpose. Typically the PVA coating is comprised of 100 parts by weight PVA and about 10 to about 20 and up to about 30 parts by weight plasticizer. Such coating composition is relatively well known to those skilled in such art.

As hereinbefore referenced, various ingredients are conventionally used in the compounding of rubber for the manufacture of rubber articles, including tires, which are well known to those having skill in such art such as the various antidegradants, processing oils and the like.

The substantial addition of the flake mica with its plate-like structure to the PVA composition, although the mechanism may not be entirely understood, has been observed to be particularly beneficial apparently because its plate-like structure (with overlapping plates) reduces the permeability of the "staining" ingredients and, thus, enhances the PVA-based coating. It has also been observed to apparently reduce the hydrophilicity of the PVA-based coating and, thus, helps to improve its resistance to degradation upon exposure to high humidity conditions.

The flake glass with its plate-like structure has been observed to provide similar results.

In further accordance with this invention, a pneumatic tire is provided having the coating of this invention on at least one of its sidewalls.

Indeed, there is a particular benefit in utilizing the coating composition for coating at least one of the sidewalls of a rubber tire, particularly a pneumatic rubber tire, namely, to provide an enhanced resistance to contact-staining and a humidity resistant coating.

Thus, in accordance with this invention, a cured rubber tire is provided having at least one of its surfaces coated with the composition of this invention.

In further accordance with this invention, a pneumatic rubber tire is provided having at least one portion thereof composed of a cured rubber containing a coloring pigment selected from at least one of titanium dioxide and zinc oxide in the absence of carbon black where the surface of said portion has a coat thereon of the composition of this invention.

The polyvinylalcohol can generally be described as being about an 80 to 99.5 percent hydrolyzed polyvinylacetate. Thus the PVA, as it would be understood by those having skill in the art, contains a small amount of polyvinyl acetate, although it is still conventionally referred to (as it is here) as polyvinylalcohol or PVA (rather than PVAC). It usually has a number average molecular weight in the range of about 22,000 to about 50,000 and a molecular weight average in the range of about 84,000 to about 110,000, although these values are not considered critical but are desirable. Sometimes a molecular weight in the lower range is used for the PVA if a more flexible or pliable coating is desired.

The advantages of this invention are more particularly shown by the following example in which the parts and percentages are by weight unless otherwise indicated.

EXAMPLE I

Sulfur cured rubber samples were obtained having the dimensions of about 1 inch by 2 inches with a thickness of about ¼ inch.

Both samples contained a particulate titanium dioxide white colored pigment without carbon black reinforcement and thus were white in color.

Water based coating compositions were prepared as a mixture of polyvinylalcohol and plasticizer (Control Coating A) and as a mixture of polyvinylalcohol, plasticizer and flake mica (Experimental Coating B) and of polyvinylalcohol, plasticizer and flake glass (Experimental Coating C).

The water based coating compositions were individually coated onto the surface of the white cured rubber samples to a wet thickness of 2 to 3 mils and allowed to dry in a hot air circulating oven at a temperature of about 120° to 140° C. Alternatively, the coatings could have been allowed to dry at room temperature (about 20° C).

For illustrative purposes, the coating composition (A), as a Control, was comprised of a mixture as shown in Table 1. Coating composition (B), was of the same recipe as (A) except that it contained 5.2 parts flake mica and Coating Composition C was of the same recipe as (A) except that it contained 5.2 parts of flake glass.

TABLE 1

| Material | Parts Coating A |
| --- | --- |
| Water | 71 |
| PVA[1] | 12.2 |
| Polyglycerol[2] | 0.3 |
| Glycerine[3] | 2.8 |
| Surfactant[4] | 0.1 |
| Biocide | 0.1 |
| Blue Dye | 1.0 |
| Defoamer[5] | 0.2 |

[1] A polyvinylalcohol from Air Products Company obtained as Vinol 205
[2] A polyglycerol from Chemical Components Inc. obtained as RZN.
[3] Glycerin from P&G, Inc.
[4] A fluorosurfactant from DuPont de Nemours & Co. obtained as Zonyl FSP.
[5] From Versa Chemical Co. identified as a paraffinic oil-based material.

The flake mica was obtained from C. P. Hall, Inc. and reportedly had a less than about a 325 mesh size.

The flake glass was obtained as Flake Glass Type C from Owens-Corning Fiberglas Corp. having a size passing through a 1/64 inch screen and of a 1–2 micron thickness.

The coated rubber samples (A, B and C) were placed on a suitable substrate and a carbon black reinforced black colored cured rubber was placed on top of each of the coated samples. An approximately five (5) pound weight was placed on top of each of such assemblies.

The weighted assemblies were placed in a hot air circulating oven at about 70° C. for about twenty-four (24) hours.

The assemblies were removed from the oven, disassembled and the samples A, B and C washed with water to remove the aforesaid coatings therefrom. All samples looked white at this stage.

The cleaned samples were placed under U.V. (ultraviolet) lamps for about two (2) hours.

The samples were visually inspected and also tested with a photovolt meter (which measures surface reflectivity—an extent of whiteness in this example).

The following results shown in Table 2 were observed.

TABLE 2

| | Control A | Samples B and C |
| --- | --- | --- |
| Observation: | slight staining, brownish tint | remained white |

An additional similar experiment was conducted by mixing 100 parts of a PVA based coating (approximately 68 parts water, 20–25 parts PVA and remainder primarily of flake mica with a control having no mica. The mixtures were sprayed onto the cured white colored rubber sample to wet thickness of about 2-3 mils and then dried, contacted with black cured rubber containing staining chemicals, similarly aged in an oven for twenty-four (24) hours at 70° C. and then washed (to remove the coating) and exposed to ultraviolet light for about two (2) hours. Their reflectivity was measured and the following values obtained as shown in Table 3.

TABLE 3

| Sample: | Parts Flake Mica | | | |
|---|---|---|---|---|
| | Control | D | E | F |
| | 0 | 5 | 10 | 15 |
| Reflectivity | 42 | 42 | 63 | 58 |

TABLE 3-continued

| Sample: | Parts Flake Mica | | | |
|---|---|---|---|---|
| | Control | D | E | F |
| | 0 | 5 | 10 | 15 |
| Rating | | | | |

What is claimed is:
1. A coating composition comprised of 100 parts by weight polyvinylalcohol and about 10 to about 30 parts by weight of at least one of glycerin and polyglycerol and at least one water insoluble particulate material having a plate-like structure selected from at least one of flake mica and flake glass in a weight ratio of said particulate material to the PVA in the coating composition in the range of about 1/6 to about 1/1.
2. The composition of claim 1 where said plate-like structed material is an inorganic material having two substantially parallel opposing plate-like surfaces with an average width to thickness ratio in the range of about 5/1 to 30/1.

* * * * *